US012393586B2

United States Patent
Li et al.

(10) Patent No.: US 12,393,586 B2
(45) Date of Patent: Aug. 19, 2025

(54) BOTS FOR ACCOUNTING

(71) Applicant: STRIPE, INC., South San Francisco, CA (US)

(72) Inventors: Xin Li, San Jose, CA (US); Sreekanth Pothula, Collierville, TN (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 18/208,002

(22) Filed: Jun. 9, 2023

(65) Prior Publication Data

US 2024/0411758 A1   Dec. 12, 2024

(51) Int. Cl.
  *G06F 16/2453* (2019.01)
  *G06F 16/242* (2019.01)

(52) U.S. Cl.
  CPC .... *G06F 16/24549* (2019.01); *G06F 16/2423* (2019.01)

(58) Field of Classification Search
  CPC .............. G06F 16/24549; G06F 16/2423
  USPC ........................................................ 707/713
  See application file for complete search history.

(56) References Cited

U.S. PATENT DOCUMENTS

| | | | |
|---|---|---|---|
| 9,508,052 B1 * | 11/2016 | Badawy | G06Q 10/103 |
| 2023/0315749 A1 * | 10/2023 | Haelen | G06F 16/254 |
| | | | 707/602 |
| 2023/0409819 A1 * | 12/2023 | Werr | G06F 40/186 |

* cited by examiner

*Primary Examiner* — Joshua Bullock
(74) *Attorney, Agent, or Firm* — Womble Bond Dickinson (US) LLP

(57) ABSTRACT

Aspects of the present disclosure relate to systems and methods for generating processes or bots for automatically processing accounting data. Some aspects of embodiments relate to defining templates specifying actions to be performed on a periodic basis (e.g., hourly, daily, weekly, or monthly). In some embodiments, the templates further include template queries for querying data stores or other data sources (e.g., data streams). The templates may be registered for scheduled execution, instantiating the templates with runtime parameters for execution, where executing the instantiated templates includes collecting and processing data collected from source data stores to generate output data. Some aspects relate to temporarily storing output data generated by executing the instantiated templates and requesting manual approval of the output data before the data is written to an output data store or sink data store. In some circumstances, the output data store may store a general ledger of a business.

20 Claims, 10 Drawing Sheets

```
300
310  select
            d.payment_amount * -1 Amount,
            lower(d.payment_currency_code) Currency,
            date_format(a.date, '%Y-%m-%d') as Date,
            ...
            a.reconciliation_key
            d.payment_number,
            d.payment_date,
            a.amount,
            ...
320  from
            parsedbankaccounttransactions a,
            dataview.bank_transaction_redactions b,
            bankaccounts c,
            ap.ap_payment_details d
330  where
            1 = 1
            and d.day = (                                    350
                    select
                            max(e.day)                       351
                    from
                            ap.ap_payment_details e
            )                                                352
            and d.business_unit_name= '{{business_unit_name}}'
            and substring(cast(d.payment_date as varchar), 1, 7) = '{{month}}'
            and a.bank_account_transaction = b._id
            and d.payment_method = 'ACH'
            and
            ...
```

311 → select
　　d.payment_amount * -1 Amount,
　　lower(d.payment_currency_code) Currency,
　　date_format(a.date, '%Y-%m-%d') as Date,
　　...
　　a.reconciliation_key
　　d.payment_number,
　　d.payment_date,
　　a.amount,
　　...

321 → from
　　parsedbankaccounttransactions a,
　　dataview.bank_transaction_redactions b,
　　bankaccounts c,
　　ap.ap_payment_details d 331 → where
　　1 = 1
　　and d.day = (
　　　　select
　　　　　　max(e.day)                                360
　　　　from
　　　　　　ap.ap_payment_details e                  361
　　)
　　and d.business_unit_name= 'household_products'   362
　　and substring(cast(d.payment_date as varchar), 1, 7) = 'February'
　　and a.bank_account_transaction = b._id
　　and d.payment_method = 'ACH'
　　and
　　...

FIG. 3B

BOTS FOR ACCOUNTING

BACKGROUND

Accounting relates to the measurement, processing, and communication of financial information about an economic entity, such as a business. Some businesses process millions of transactions every month, representing billions of dollars of value. One aspect of accounting relates to entering these transactions into various ledgers to track various categories of accounts, such as revenue, expense, assets, liabilities, and equity, where the group of accounts may be referred to, together, as a general ledger. This information can provide individuals operating the organization with an overall view of the flow of funds and allocation of resources within the business and may also be used to reconcile transactions (such as matching invoices to line entries in bank statements) and detect discrepancies.

The above information disclosed in this Background section is only for enhancement of understanding of the present disclosure, and therefore it may contain information that does not form the prior art that is already known to a person of ordinary skill in the art.

SUMMARY

Aspects of the present disclosure relate to systems and methods for generating processes or bots for automatically processing accounting data. Some aspects of embodiments relate to defining templates specifying actions to be performed on a periodic basis (e.g., hourly, daily, weekly, or monthly). In some embodiments, the templates further include template queries for querying data stores or other data sources (e.g., data streams). Some further aspects of embodiments of the present disclosure relate to systems and methods for registering templates for scheduled execution, instantiating the templates with runtime parameters for execution, and executing the instantiated templates to collect and process data collected from the data sources (or source data stores) to generate output data. Some further aspects of embodiments of the present disclosure relate to temporarily storing output data generated by executing the instantiated templates and requesting manual approval of the output data before the data is written to an output data store or sink data store. In some circumstances, the output data store may store a general ledger of a business.

BRIEF DESCRIPTION OF THE DRAWINGS

The accompanying drawings, together with the specification, illustrate exemplary embodiments of the present invention, and, together with the description, serve to explain the principles of the present invention.

FIG. 3A is an example of an accounting template of an accounting automation system according to one embodiment of the present disclosure.

FIG. 3B is an example of a rendered accounting template for an accounting automation system according to one embodiment of the present disclosure.

DETAILED DESCRIPTION

Figure 1:
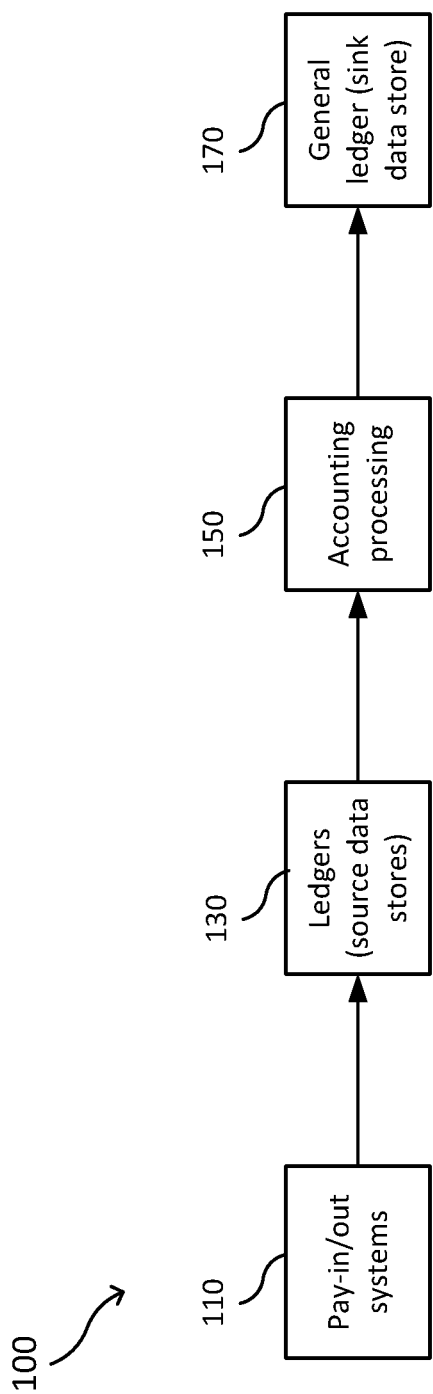
FIG. 1 is a block diagram of data flow in an accounting system according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

FIG. 1 is a block diagram of data flow in an accounting system according to one embodiment of the present disclosure. In more detail, FIG. 1 illustrates an accounting data pipeline 100 for processing accounting data associated with an organization, such as a business. As shown in FIG. 1, data originating from pay-in/out systems 110 is booked (e.g., stored) into ledgers 130. The pay-in/out systems 110 may include, for example, bank transactions (e.g., wire transfers and automated clearing house (ACH) transactions), credit card and debit card payments, online payment processing systems, and the like, and may include payments received by the organization from third parties (pay-in) and payments made by the organization to third parties (pay-out). The ledgers 130 store the information from the pay-in/out systems 110 and serve as source data stores (e.g., relational databases, object data stores, key-value stores, stream data processors, etc.) for an accounting processing system 150.

An automated accounting processing system 150 reads the data from the ledgers 130 and records the pay-in/pay-out data into a sink data store 170, which may store a general ledger representing the finances of the organization or entity (e.g., a company). While many routine transactions can be processed automatically using simple rules, some types of transactions may require specialized knowledge (e.g., human accountants) to be correctly processed by the accounting processing system 150. Manual processing by human accountants imposes a burden on the business in the form of increased processing time, potential error rates, and expenses that increases approximately linearly as the number of transactions processed by the organization grows.

Examples of situations that are difficult to automate include: corporate cash reconciliation (e.g., matching invoices from suppliers against bank statement line items and generating general ledger entries to be reconciled); pending chargebacks reclassification (e.g., tracking funds involved in pending disputes); and negative merchant balance reclassification (e.g., in the case of a business that serves as a payment processor, collecting negative merchant account balances and booking the negative balances in a separate asset account).

Accordingly, aspects of embodiments of the present disclosure relate to systems and methods for automating complex accounting processes, where embodiments of the present disclosure provide frameworks for encoding specialized human knowledge and procedures into templates for querying data and processing the data and for automatically instantiating and executing the templates on a periodic basis. This accounting automation system reduces the amount of rote and manual labor imposed on human accountants.

In more detail, some aspects of embodiments of the present disclosure relate to systems and methods that provide domain experts (e.g., accounting professionals) with tools for defining automatic processes that perform complex accounting tasks, such as by defining the data sources to be queried and defining methods or plans for processing the data retrieved based on the query to perform the accounting tasks. Additional aspects of embodiments of the present disclosure relate to systems for scheduling automatic processes to be executed periodically, and instantiating templates of the automatic processes based on runtime parameters for execution.

The results generated through executing the automated process are then stored, in some embodiments, for review and approval by a domain expert (e.g., if the automated process detects discrepancies that it is not configured to automatically resolve) before publishing the generated data to a sink data store (e.g., a data store representing the general ledger of a business). In some embodiments, the results of the automated process are written directly to the sink data store, without presenting the data for manual review.

Figure 2:
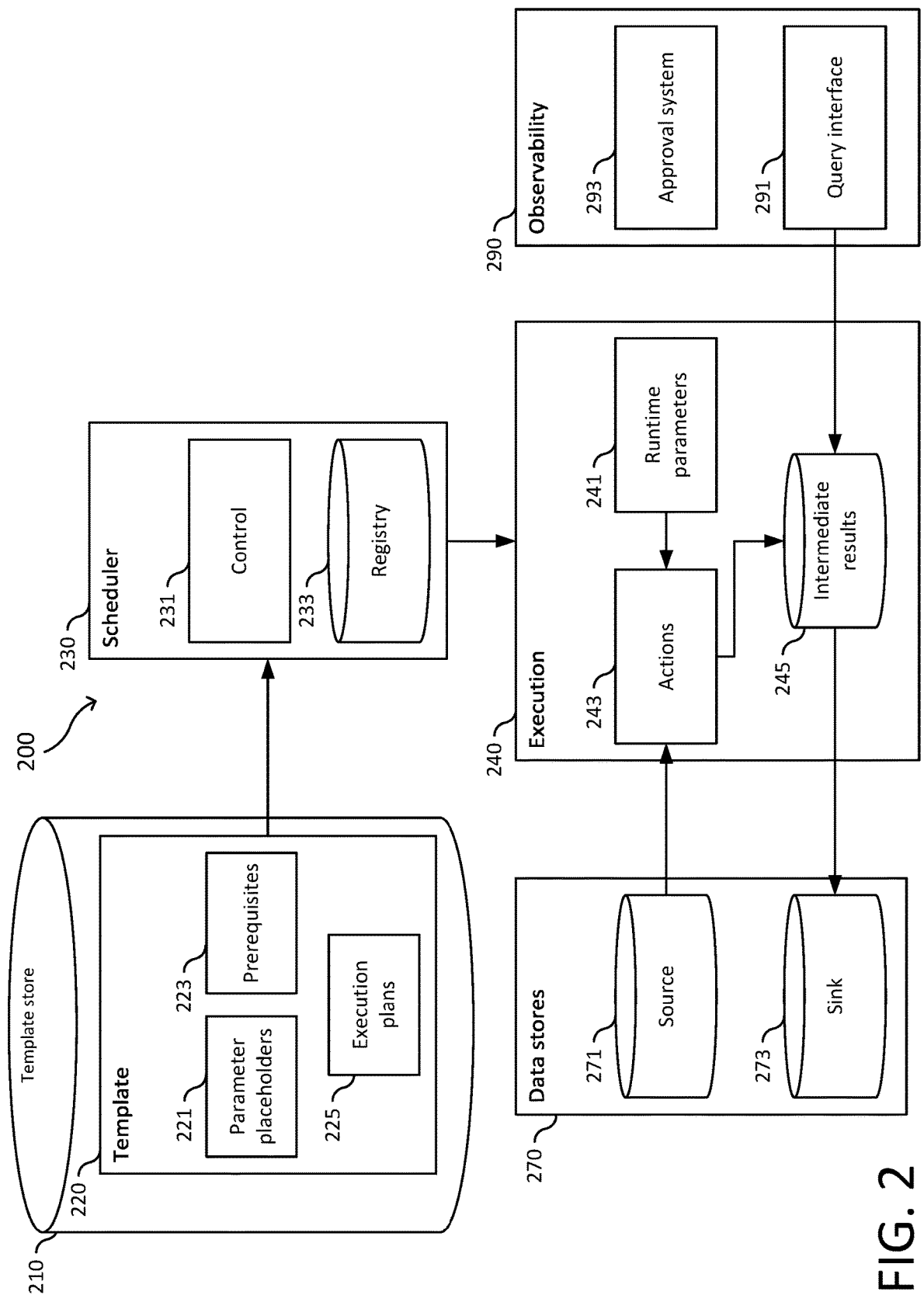
FIG. 2 is a block diagram of an accounting automation system according to one embodiment of the present disclosure.

FIG. 2 is a block diagram of an accounting automation system 200 according to one embodiment of the present disclosure. In the example shown in FIG. 2, the accounting automation system 200 includes a template store 210. The template store 210 stores one or more templates 220, where a template 220 defines a structure for data processing tasks to be performed. These data processing tasks may include, for example, accounting tasks such as cash reconciliation, pending chargebacks reclassification, and negative merchant balance reclassification.

As shown in FIG. 2, a template 220 includes a template query that includes parameter placeholders 221, one or more runtime prerequisites 223, and a template execution plan 225. The accounting template 220 is designed by a subject matter expert (e.g., a human accountant) to perform an accounting task (e.g., cash reconciliation), where the template query represents a general form of a query for accessing data from a data store and the template execution plan 225 defines one or more steps for processing the data retrieved by the query (e.g., having fields as defined by the query) to perform the task when the one or more runtime prerequisites 223 are satisfied.

For example, FIG. 2 shows that the template 220 includes one or more parameter placeholders 221, where these parameter placeholders are filled in with specific values when the template is instantiated to make it runnable or executable, as discussed in more detail below.

FIG. 3A is an example of an accounting template 300 for an accounting automation system according to one embodiment of the present disclosure. The example of FIG. 3A shows a portion of a template query that includes a 'select' clause 310, a 'from' clause 320, and a 'where' clause 330 in a manner similar to that of a structured query language (SQL) query. A given data store may have one or more tables, where each table stores multiple records. Each record in the table may have the same underlying data structure and is made up of one or more fields of data. For example, each record in a table of bank transactions may correspond to a single bank transaction, where record stores an account identifier, a transaction date, a transaction amount, a transaction currency, and a description. The 'from' clause 320 identifies the tables or types of records that will be drawn from when performing the query (e.g., in the example of FIG. 3A, the data is drawn from the tables 'parsedbankaccounttransactions' (which is given a local alias of 'a'), 'dataview.bank_transaction_redactions' (which is given a local alias of 'b'), 'bankaccounts' (which is given a local alias of 'c'), and 'ap.ap_payment_details' (which is given a local alias of 'd'). The 'select' clause 310 identifies the fields of the data that will be included in the result or output from running the runtime query of the accounting template 300, and the 'where' clause 330 specifies constraints that filter the data that is drawn from the tables identified in the 'from' clause 320. For example, the 'select' clause 310 may identify fields such as "business name,' 'bank account,' and 'transaction type', and the 'where' clause 330 may specify that the data should be filtered to include only transactions involving a specific bank account (e.g., where 'bank account'='12345' and 'transaction type'='debit').

In the example of FIG. 3A, the template query includes two parameter placeholders 350, which include a 'business_unit_name' 351 and a 'month' 352, where these parameter placeholders 350 are filled in based on configuration parameters or runtime parameters when the template is rendered to instantiate the template for execution, as described in more detail below.

While FIG. 3A merely depicts a where clause of one template query, embodiments of the present disclosure are not limited thereto and may include a plurality of template queries, where the different template queries may correspond to queries to be executed on one or more different source data stores 271. In such circumstances involving retrieving different collections of data from multiple different source data stores 271 (and/or multiple different queries to retrieve different data from a same data store), the template execution plan may define or more steps for combining (e.g., merging or cross-referencing) the different collections of data.

Some aspects of embodiments of the present disclosure relate to registering and executing jobs at a scheduler 230 for execution in accordance with a schedule.

Figure 4A:
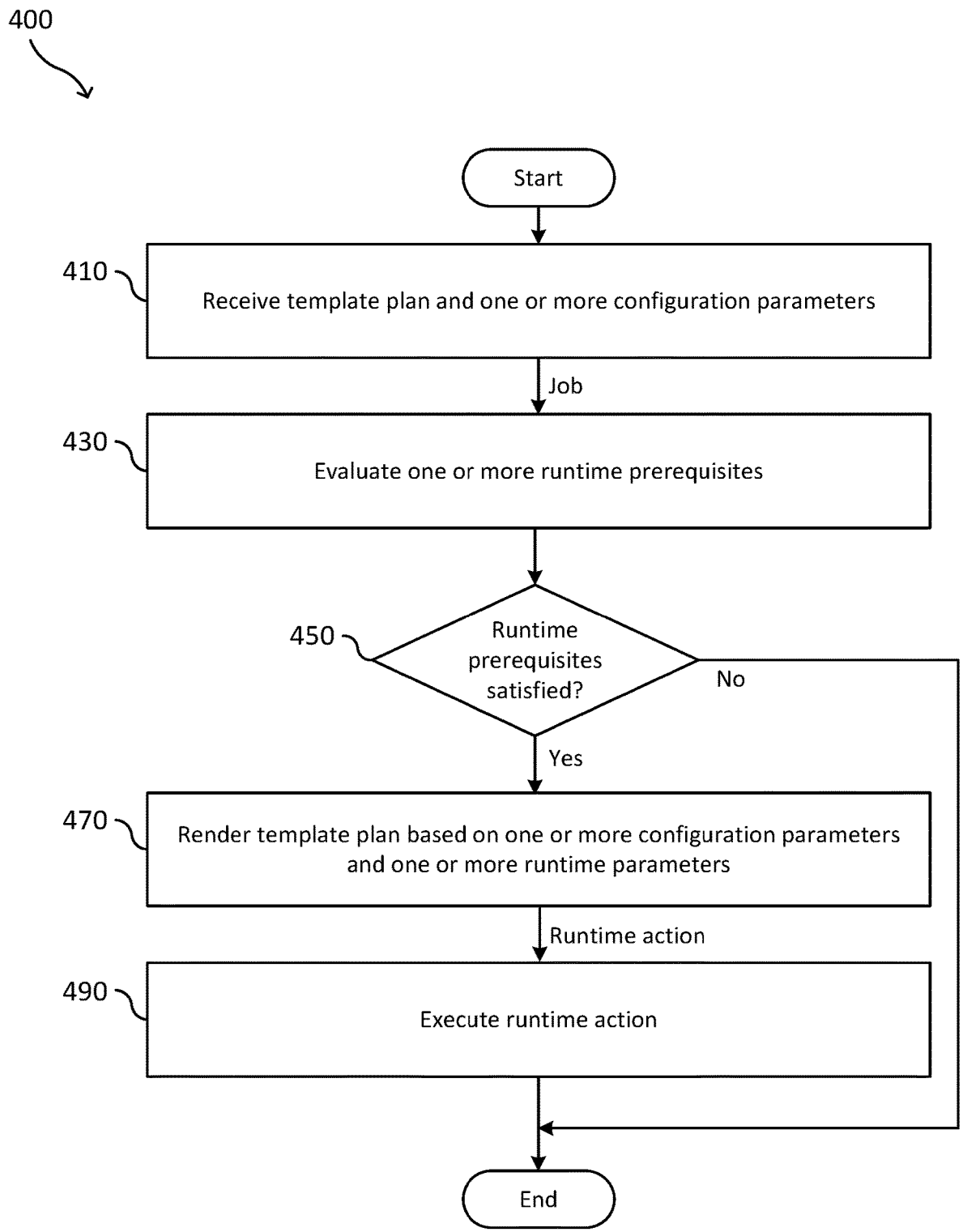
FIG. 4A is a flowchart of a method for operating an accounting automation system according to one embodiment of the present disclosure.

FIG. 4A is a flowchart of a method 400 for operating an accounting automation system according to one embodiment of the present disclosure. As shown in FIG. 2, a scheduler 230 may include a controller 231 and a job registry 233. As shown in FIG. 4A, at step 410 a scheduler 230 of an accounting automation system 200 receives a template plan and one or more configuration parameters. When registering a template 220 with a scheduler 230, the template may be accompanied by one or more configuration parameters that are used to configure the template.

Returning to the example shown in FIG. 3A, one of the parameter placeholders 221 is a 'business_unit_name' 351 appearing in the 'where' clause 330 of the accounting template 300. In this example, the business unit name is used in the 'where' clause 330 to filter records from the ap.ap_payment_details table so cash reconciliation can be performed on a per-business unit basis. Because the underlying process and logic for performing cash reconciliation is substantially the same across different business units, an expert can design a single template 220 for performing cash reconciliation operations across an entity. The same cash reconciliation template 220 can then be configured to operate on transactions associated with multiple different business units of the entity by supplying the names of different business units (e.g., each business unit within a corporation) as configuration parameters for corresponding jobs based on the same template 220. This allows the cash reconciliation process can be run separately for each such business unit (e.g., which reduces the number of transactions that need to be considered when performing cash reconciliation, assuming transactions are correctly tagged with names of their corresponding business units, or which simplifies analysis when different business units need to perform the task at different time intervals).

In some embodiments of the present disclosure, when registering a template as a job, the one or more configuration parameters may also include one or more scheduling parameters to control how the jobs are run by the controller 231 of the scheduler 230. Scheduling parameters in various embodiments of the present disclosure may include for example, scheduling based on periodic scheduling based on date of month (e.g., the third day of every month or the first Monday of every month), day of week (e.g., every Wednesday or the first business day of the week), week of year (e.g., every 10 weeks), day of year (e.g., every year on April 16 and the like, or one time occurrences based on specific dates. In some embodiments, jobs may be rescheduled based on failure conditions (e.g., if a job is detected as failing to satisfy a the one or more prerequisites, as discussed below, the scheduling parameters may include parameters for rescheduling the job, such as by rescheduling the job for 2 business days later).

Accordingly, in some embodiments of the present disclosure, at FIG. 4A step 410, in response to receiving a template plan and one or more configuration parameters, the schedule 230 registers the template plan and the one or more configuration parameters as a job in a job registry 233 schedules the execution of the job based on one or more received scheduling parameters.

Referring back to FIG. 2, the accounting automation system 200 includes a job executor 240 that is configured to receive and process jobs for execution. In more detail, in some embodiments, the controller 231 of the scheduler 230 provides jobs for execution by the job executor 240 in accordance with the schedule set by the one or more scheduling parameters.

At FIG. 4A, step 430 the job executor 240 of the accounting automation system 200 evaluates one or more runtime prerequisites 223 associated with the job. In some embodiments of the present disclosure, the runtime prerequisites 223 are represented as a Boolean expression or conditional expression. In some embodiments, the runtime prerequisites 223 are expressed as a function that may take one or more runtime parameters as input (e.g., a current date, a current time, a current value of some externally maintained data or counter, or the like) to compute an evaluation of the runtime prerequisites. In some embodiments, the prerequisites include determining whether all of the data that is necessary for processing the job is ready and available. For example, a monthly task may be performed on all of the previous month's transactions, and therefore one prerequisite for this monthly job is to ensure that all of the transactions through to the last day of a previous month have been recorded in a data store and are available for analysis.

As another example, some data in an accounting system may be sensitive and access to these data may be controlled by sets of access permissions. Likewise, many data stores used by an entity are treated as sources of truth, such that the quality of the data written to them (e.g., the accuracy and provenance of the data) is controlled by limiting write access to trusted parties. In such cases, the one or more prerequisites may include ensuring that the current job to be executed by the job executor 240 has sufficient permissions (e.g., credentials such as access keys, certificates, or permissions granted to an account configured to execute the job) to access the needed data. For example, the permissions may change over time and between different executions of the registered job caused by changes in access requirements for the data (which may be caused by changes in the sensitivity of the data), caused by revocation of previously granted credentials, caused by changes to the data sources themselves (e.g., renaming of paths or resource locators for resources, deletion or replacement of data sources, changes in application programming interfaces for the data sources, etc.), and the like.

At FIG. 4A, step 450 the job executor 240 determines whether the runtime prerequisites were satisfied. If not, then the process of executing this job ends (and the job may be run again at the next scheduled interval). In some embodiments, in a case where the runtime prerequisites were not satisfied, the job may be rescheduled by the scheduler 230 to be executed at a later time but, in some cases, sooner than the next regularly scheduled invocation of the registered job. For example, if a job is scheduled to be run on a monthly basis, but there is an unsatisfied prerequisite associated with ensuring that all of the necessary data is ready for processing, then the job may be rescheduled to run a few days later, at which point the required data may be ready for processing.

In a case where the runtime prerequisites were met, then at FIG. 4A step 470, the job executor 240 (e.g., as shown in FIG. 2) renders a template plan of a registered job based on the one or more configuration parameters and one or more runtime parameters to instantiate the job for execution as a runtime action. (For example, the template plan that is included in the registered job may be thought of as a defining a class of executable jobs, where filling in the parameter placeholders generates an instance of the class to be executed.). In more detail, while the configuration parameters are provided together with the template plan as part of the job during registration stored in the registry, the one or more runtime parameters are determined at the time when the job is provided to the job executed to be run or executed (e.g., at the scheduled time). Examples of runtime parameters include the current date, a current time, a current balance on an account, information read from a file (e.g., a configuration file), information read from an outside source (e.g., through an application programming interface of a network-based service), or the like.

To render the template plan, the job executor 240 replaces the parameter placeholders 221 in the template 220 with the values from the one or more configuration parameters and/or one or more runtime parameters 241. For example, referring back to the example of FIG. 3A, the accounting template 300 includes a first parameter placeholder 351 ("business_unit_name") and a second parameter placeholder 352 ("month"). The first parameter placeholder 351 ("business_unit_name") in this example is filled by a configuration parameter (e.g., the "household_products" business unit name) and the second parameter placeholder 352 ("month") may be a runtime parameter (e.g., replaced with the current month at the time of execution, such as "February" or "2," depending on how the month is encoded in the data). Another example of a runtime parameter is a "prior_month" runtime parameter that corresponds to the month prior to the current month (e.g., having a value numerically one less than the current month, and where the month prior to January wraps back to December).

FIG. 3B is an example of a rendered accounting template 301 of an accounting automation system according to one embodiment of the present disclosure. FIG. 3B is substantially similar to FIG. 3A, where the rendered accounting template 301 includes a 'select' clause 311, a 'from' clause 321, and a 'where' clause 331, but where the parameter placeholders are replaced with values 360 from the one or more configuration parameters (e.g., the value "household_products" 361 in replaces of the first parameter placeholder of "business_unit_name") and the one or more runtime parameters (e.g., the value "February" 362 in replaces of the first parameter placeholder of "month"). Rendering the accounting template 301 generates an executable runtime action.

Figure 4B:
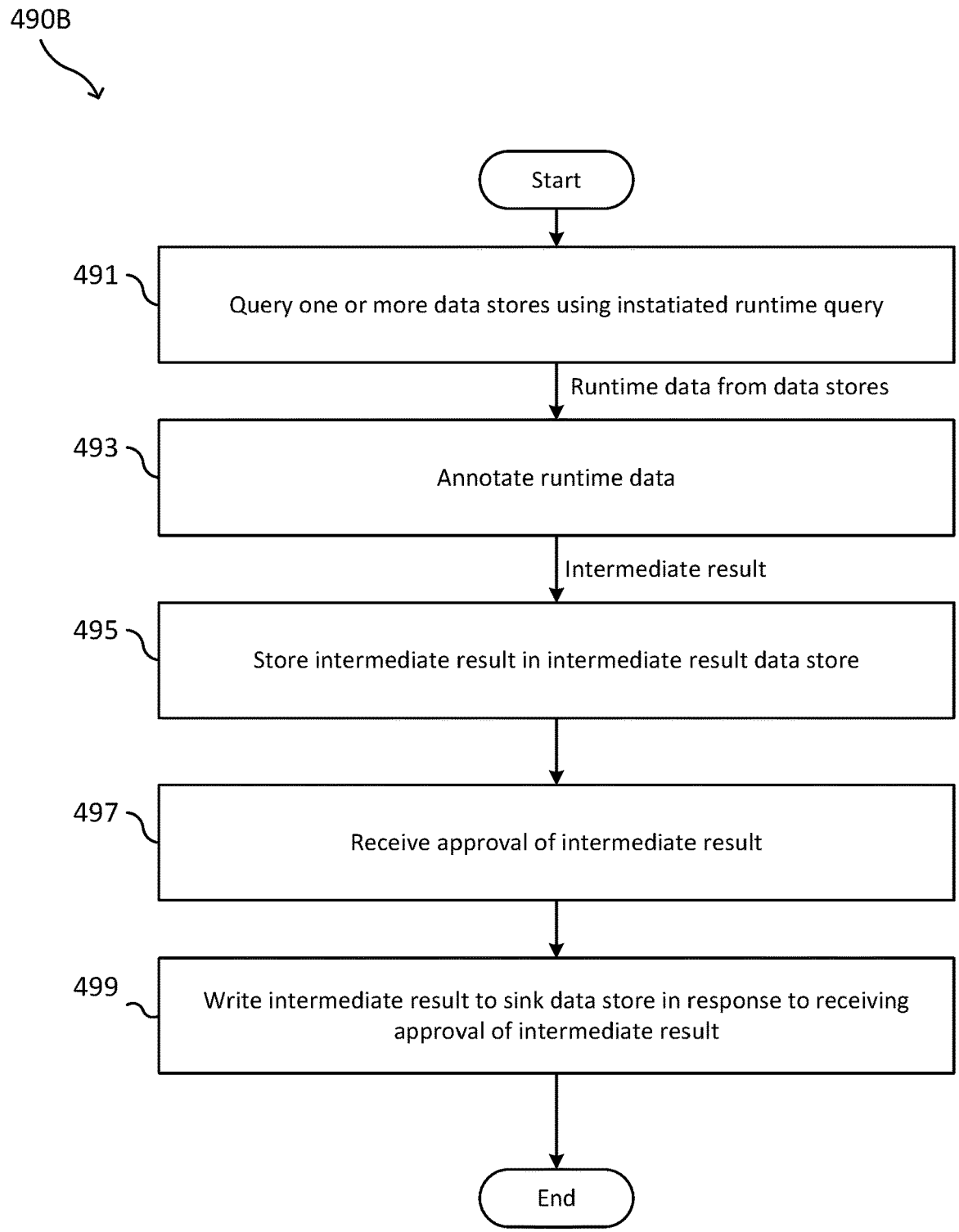
FIG. 4B is a flowchart depicting some examples of operations performed by a plan according to some embodiments of the present disclosure.

At FIG. 4A step 490 the job executor 240 executes the runtime action 243 (an instance of the registered job) as specified by the rendered template plan. FIG. 4B is a flowchart depicting a method 490B including some examples of operations performed by a plan according to some embodiments of the present disclosure, without being limited to the steps shown in FIG. 4B and without requiring all of the steps shown in FIG. 4B.

At FIG. 4B step 491, the job executor 240 runs an instantiated runtime query to query one or more tables in one or more data stores 270 to obtain runtime data. As shown in FIG. 2, the one or more data stores may include one or more source data stores 271 (e.g., from which data is read) and one or more sink data stores 273 (to which data is written). In some circumstances, a data store may serve as both a source data store and a sink data store. As noted above, FIG. 3B shows one example of a portion of an instantiated runtime query (e.g., having the form of a SQL query).

At FIG. 4B step 493, the job executor 240 annotates the runtime data retrieved from the data stores based on the plan. For example, these annotations may relate to combining data from different tables (e.g., matching data from different tables based on SQL join operations or the like) attempting to find matches between different data based on matching numbers in different fields (e.g., matching entries from different tables based on amounts of currency or based on transaction identifiers) or including other data that may be required by accountants to book a transaction in accordance with accounting principles.

At FIG. 4B step 495, the job executor stores the annotated runtime data as an intermediate result in an intermediate result data store 245, which temporarily stores the results of the actions without the risk of committing potentially incorrect results to a sink data store 273 before approval of the intermediate results that were automatically generated by the executed runtime action 243.

For example, in some embodiments of the present disclosure, an observability platform 290 provides access to the intermediate results stored in the intermediate result data store 245 through a query interface 291. An intermediate result approval system 293 may then access the intermediate results through the query interface 291.

In some embodiments of the present disclosure, the intermediate result approval system 293 performs automated verification of the intermediate results in the intermediate results data store 245 such as by ensuring internal consistency between the records in the intermediate results and ensuring external consistency with external data (e.g., data stored in the data stores 270). In some embodiments, automatic analysis of the intermediate results includes rule-based or model-based anomaly detection. The intermediate result approval system 293 may then automatically generate an approval of the intermediate results or a rejection of the intermediate results in accordance with whether the intermediate results satisfy the automated verification process.

In some embodiments of the present disclosure, the intermediate result approval system 293 provides a user interface for a human expert to manually review the intermediate results and to provide approval or rejection of the intermediate results based on the manual review. The user interface may include, for example, interactive dashboards of detected anomalous transactions and graphs depicting the intermediate results and trends detected therein.

At FIG. 4B step 497 the system receives approval of the intermediate results and at step 499, in response to receiving the approval of the intermediate results, the job executor 240 writes the intermediate results to the sink data store 273. In circumstances where the intermediate results are rejected, the intermediate results may continue to be stored in the intermediate result store or discarded, as will be discussed in more detail below.

As one specific illustration of the execution of an instantiated plan, a template for corporate cash reconciliation may be instantiated to perform the following steps. Querying one or more data stores may include querying an invoice table with given start and end dates (the start and end dates may be parameter placeholders in the template 220 and in the registered job, and may be rendered at runtime with a runtime parameter, such as the current date, which is used to automatically compute the start and end dates, such as setting the start date to the first day of the previous month and the end date to the last day of the previous month). Querying the one or more data stores may further include querying the parsed bank statements to find matches based on conditions such as: supplier name, payment ID, currency, amount, and the like, enhanced with other techniques such as regular expression matching, normalization, rule-based heuristics. The conditions or rules can be based on specific columns (or attributes) of the intermediate data, such as timestamp, amount, currency, description, and so on according to rules specified by accountants in accordance with accounting principles, where those accounting principles may vary based on region (e.g., country or other jurisdiction). In some embodiments, the queries may be implemented using, for example, structure query language (SQL) or a programming language such as Python or Ruby. Some embodiments also provide graphical user interfaces for users to generate non-trivial queries on data sets displayed in the graphical user interfaces.

The query results obtained above may then be automatically annotated in accordance with those matching conditions and rules specified in the execution plan, and the annotated results are stored in the intermediate result data store 245. After approval of these cash reconciliation results, the annotated results are uploaded to a reconciliation engine as the sink data store and the reconciliation engine is notified of the completion of the task and status (e.g., success or failure) such that it can process the uploaded data in the case of a success.

As another specific example of the execution of an instantiated plan, performing pending chargebacks reclassification may start with querying a dispute table with given start and end dates (e.g., where the start and end dates may be represented as parameter placeholders in the template and rendered with the appropriate dates based on the current date as a runtime parameter). The results are then annotated with additional information in accordance with the plan, such as by showing a United States Dollar (USD) amount equivalence for each disputed amount, a company code, a ledger name, and the like.

The annotated result is then converted by the job executor 240 into journal entries with more additional information such as general ledger (GL) account numbers, credit/debit amounts, accounting dates, and the like.

The results from the annotation of the results and the conversion of the data into journal entries are then published as intermediate results to the intermediate result data store 245 for review and approval. If approved, the journal entries are then recorded to a sink data store 273 (e.g., the data store representing the general ledger for the entity).

Figure 4C:
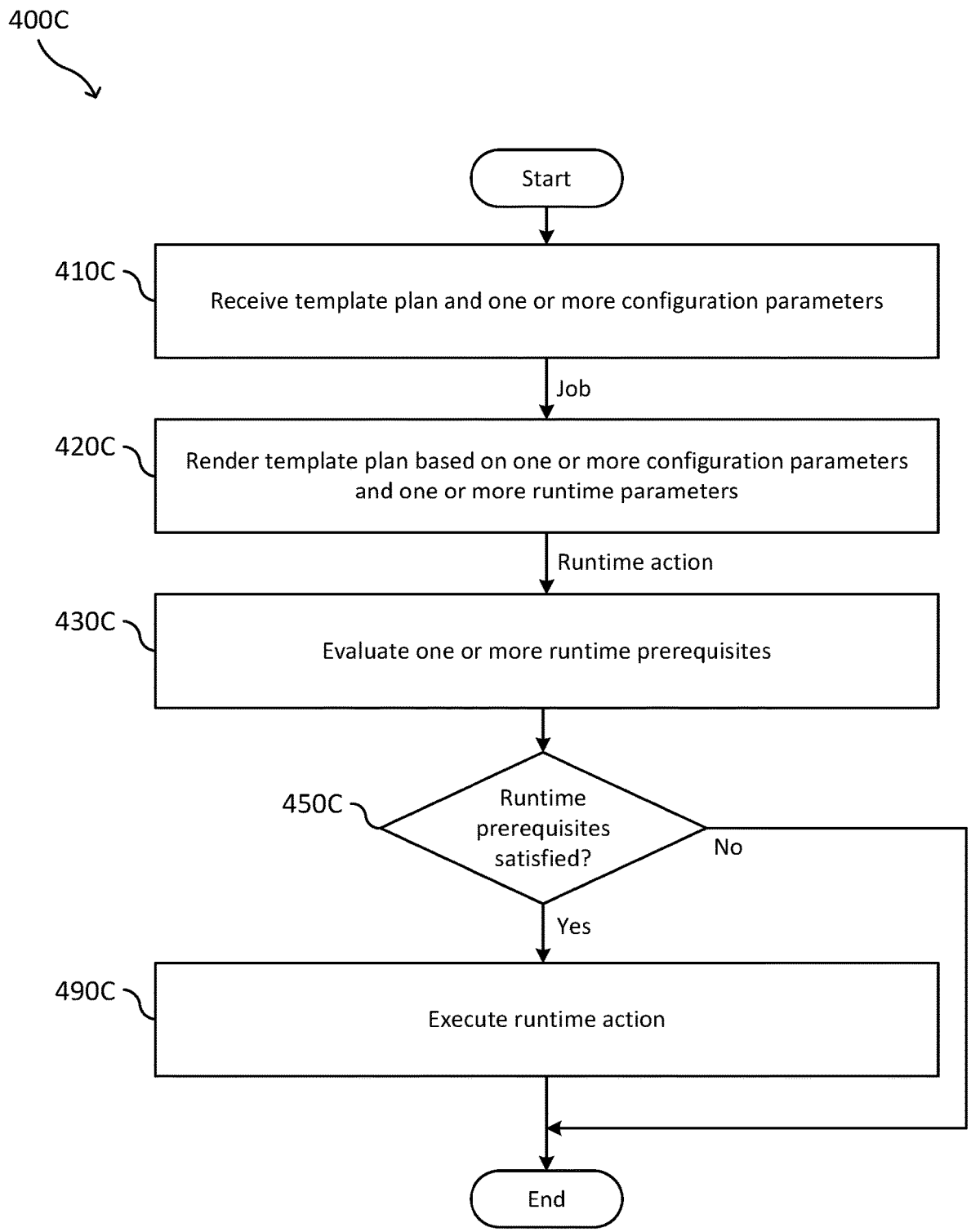
FIG. 4C is a flowchart of a method for operating an accounting automation system according to one embodiment of the present disclosure.

While the flowchart of FIG. 4A shows the prerequisites as being evaluated at step 430 prior to rendering the template plan at step 470, embodiments of the present disclosure are not limited thereto. For example, FIG. 4C is a flowchart of a method 4000 for operating an accounting automation system according to one embodiment of the present disclosure. The method 4000 shown in FIG. 4C is substantially similar to the method 400 shown in FIG. 4A, where like steps are numbered with like numerals with the suffix "C." In more detail, as shown in FIG. 4C, at step 410C a scheduler 230 of an accounting automation system 200 receives a template plan and one or more configuration parameters. FIG. 4C differs from FIG. 4A in that, instead of rendering a template plan based on one or more configuration parameters and one or more runtime parameters at step 470 after determining whether the runtime prerequisites were satisfied at step 450 as shown in FIG. 4A, the rendering of the template plan is performed at step 420C, before evaluating the one or more runtime parameters at step 430C. When ordering the operations as shown in FIG. 4C, the one or more runtime prerequisites may include one or more placeholder parameters that are rendered or filled-in at step 420C based on values drawn from or computed from the one or more configuration parameters and/or the one or more runtime parameters, thereby increasing the flexibility or expressiveness available in the specification of the one or more runtime prerequisites.

At FIG. 4C, step 450C the job executor 240 determines whether the runtime prerequisites were satisfied. If not, then the process of executing this job ends (and the job may be run again at the next scheduled interval). In some embodiments, in a case where the runtime prerequisites were not satisfied, the job may be rescheduled by the scheduler 230 to be executed at a later time but, in some cases, sooner than the next regularly scheduled invocation of the registered job. For example, if a job is scheduled to be run on a monthly basis, but there is an unsatisfied prerequisite associated with ensuring that all of the necessary data is ready for processing, then the job may be rescheduled to run a few days later, at which point the required data may be ready for processing. In a case where the runtime prerequisites were met, then at FIG. 4C, step 490C the job executor 240 executes the runtime action 243 (an instance of the registered job) as specified by the rendered template plan.

As noted above, in some circumstances the approval process may detect an error in the intermediate results, such as an internal inconsistency among the records within the intermediate results and/or an external inconsistency between the intermediate results and other data (e.g., other data retrieved from the data stores 270). This may indicate that there is a problem with the template 220 that produced the intermediate results and/or may indicate errors in the runtime data retrieved from the source data stores 271. In such circumstances the intermediate results may continue to be stored in the intermediate result data store 245 for further review and analysis to determine the underlying cause of the error.

Some embodiments of the present disclosure further relate to capturing and providing an execution trace that represents how the runtime data that was retrieved from the source data stores 271 and was processed to produce the erroneous intermediate results, to provide a tool for determining the cause of the error.

In more detail, the job executor 240 stores the one or more runtime parameters used to instantiate the registered job for a given run (e.g., the runtime parameters used to fill the placeholder parameters in the template). This allows the action to be re-executed at a later time with the previously saved runtime parameters and allows a user to step through the execution of a job (e.g., stepping through the source code of the template on a line-by-line basis, or setting breakpoints in the source code), as instantiated with the stored runtime parameters, to debug potential problems in the template or detecting errors in in the data retrieved from the source data stores 271.

In some embodiments, during execution of an instantiated job (e.g., during execution of a runtime action at FIG. 4 step 490C), the job executor 240 further stores the runtime data retrieved from the source data stores 271 (the results of the runtime queries). This may beneficial in circumstances where the input data is transient and may not be available for retrieval for debugging a template at a later time and allows re-execution of the runtime action without sending repeated queries to the data stores (which may be computationally expensive to perform).

Accordingly, in some embodiments of the present disclosure, the intermediate result approval system 293 provides a user interface to display an execution trace of a runtime action, which shows the sequence of operations performed on the runtime data to compute the intermediate results. This allows a user of the intermediate result approval system 293 to analyze the root causes of errors in the intermediate results and to modify the template or to correct erroneous records.

As noted above, automating accounting operations generally requires expert business and accounting knowledge, but such experts may lack software development skills. Accordingly, aspects of embodiments of the present disclosure provide technical advantages for improving the automation of accounting operations. These advantages include simplifying processes for subject matter experts to generate templates that represent recurring accounting tasks. These templates can then be configured using configuration parameters to tailor the templates to particular business units or use cases, and then are then automatically instantiated with runtime parameters (e.g., parameters whose values are automatically determined at runtime) and executed to perform the configured accounting task (e.g., cash reconciliation).

Accounting tasks differ from some other types of recurring tasks in that they rely on processing data from a trustworthy data source where the data used for accounting purposes are stored. Likewise, many accounting tasks generate data that must also be trustworthy such that downstream users can also consider the data produced by the automated tasks to be trustworthy. For this reason, the prerequisites for an accounting bot always include some upstream jobs which produce the data, and therefore the accounting task automation system according to some embodiments of the present disclosure possess security credentials (e.g., permissions) in order to read sensitive data and to write to trusted data stores. This further involves verifying that the prerequisites for running the automated accounting task are satisfied at FIG. 4C step 450C (e.g., that the accounting task still possesses the necessary credentials) to perform the specified operations.

In addition, accounting information may be time sensitive. For example, some business processes may rely on having certain types of accounting data being processed and available for use within specified timeframes (e.g., transactions for a previous month must all be processed in the first three days of the following month). As such, aspects of embodiments of the present disclosure further relate to the use of a scheduler that controls the timing of the execution of tasks based on scheduling parameters set on a per-task basis (or set based on the registered job) and rescheduling the execution of jobs to meet the required timeline in cases of temporary failures.

As discussed above, accounting data is sensitive and downstream users generally rely on the accuracy of the data. Accordingly, some aspects of embodiments of the present disclosure further relate to providing intermediate results generated by automated accounting task or job for review and approval prior to publishing the intermediate results to a trusted data store. These the intermediate results also must be protected with limited access permissions.

Figure 5:
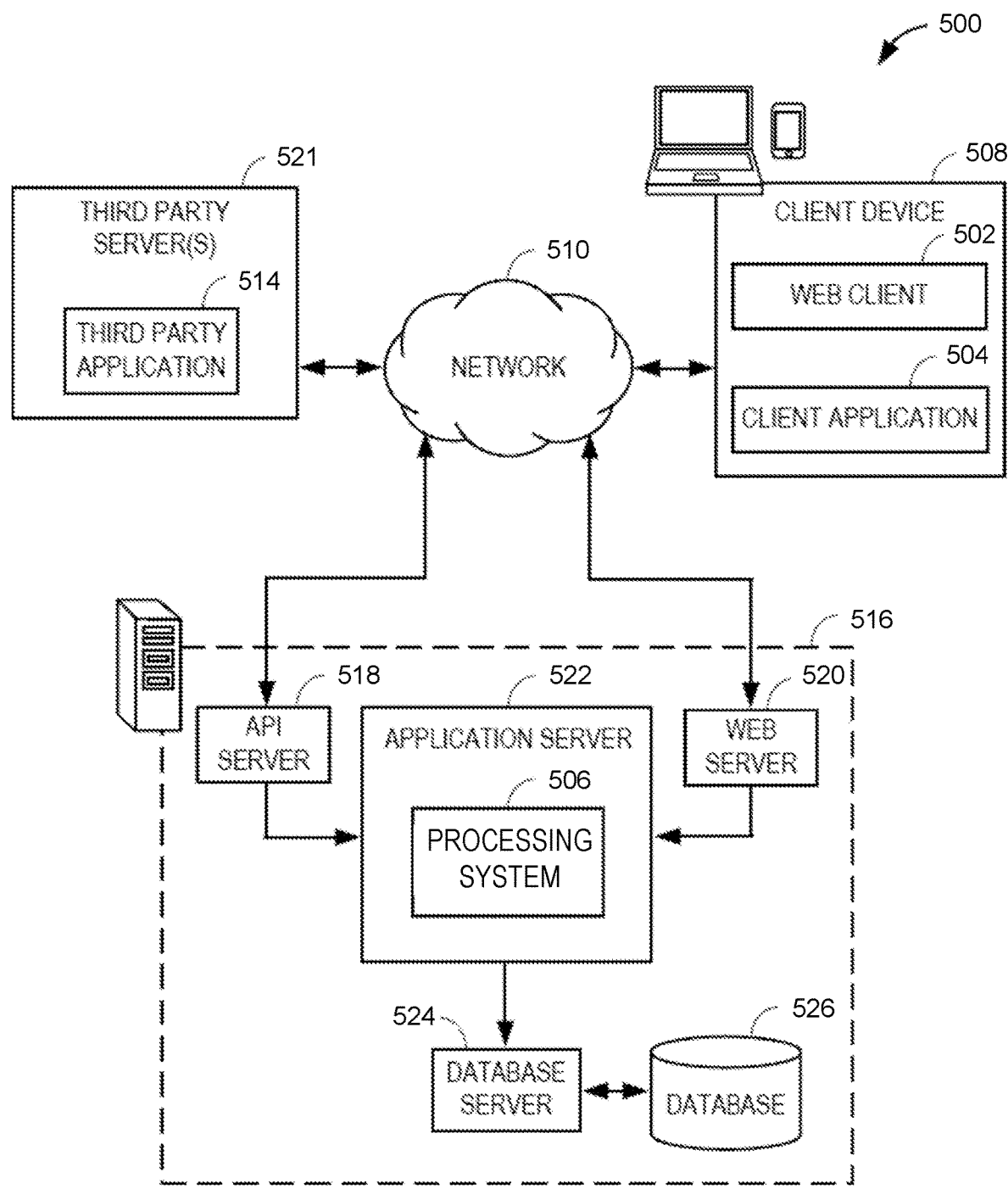
FIG. 5 is a block diagram illustrating a high-level network architecture of a computing system environment for operating a processing system according to embodiments of the present disclosure.

With reference to FIG. 5, an example embodiment of a high-level SaaS network architecture 500 is shown. A networked system 516 provides server-side functionality via a network 510 (e.g., the Internet or a WAN) to a client device 508. A web client 502 and a programmatic client, in the example form of a client application 504 (e.g., client software for reviewing intermediate results, approving intermediate results, and exploring execution traces of runtime actions), are hosted and execute on the client device 508. The networked system 516 includes one or more servers 522 (e.g., servers hosting services exposing remote procedure call APIs), which hosts a processing system 506 (such as the processing system described above according to various embodiments of the present disclosure supporting service for automatically processing accounting data) that provides a number of functions and services via a service oriented architecture (SOA) and that exposes services to the client application 504 that accesses the networked system 516 where the services may correspond to particular workflows. The client application 504 also provides a number of interfaces described herein, which can present an output in accordance with the methods described herein to a user of the client device 508.

The client device 508 enables a user to access and interact with the networked system 516 and, ultimately, the processing system 506. For instance, the user provides input (e.g., touch screen input or alphanumeric input) to the client device 508, and the input is communicated to the networked system 516 via the network 510. In this instance, the networked system 516, in response to receiving the input from the user, communicates information back to the client device 508 via the network 510 to be presented to the user.

An API server 518 and a web server 520 are coupled, and provide programmatic and web interfaces respectively, to the servers 522. For example, the API server 518 and the web server 520 may produce messages (e.g., RPC calls) in response to inputs received via the network, where the messages are supplied as input messages to workflows orchestrated by the processing system 506. The API server 518 and the web server 520 may also receive return values (return messages) from the processing system 506 and return results to calling parties (e.g., web clients 502 and client applications 504 running on client devices 508 and third-party applications 514) via the network 510. The servers 522 host the processing system 506, which includes components or applications in accordance with embodiments of the present disclosure as described above. The servers 522 are, in turn, shown to be coupled to one or more database servers 524 that facilitate access to information storage repositories (e.g., databases 526). In an example embodiment, the databases 526 includes storage devices that store information accessed and generated by the processing system 506, such as the persistent store 280 of FIG. 2 and the persistent store 580 of FIG. 5 and other databases such as databases storing information associated with transactions processed by a business.

Additionally, a third-party application 514, executing on one or more third-party servers 521, is shown as having programmatic access to the networked system 516 via the programmatic interface provided by the API server 518. For example, the third-party application 514, using information retrieved from the networked system 516, may support one or more features or functions on a website hosted by a third-party. For example, the third-party application 514 may serve as a data source for retrieving, for example, transaction information and/or price information regarding transaction fees and exchange rates, or other data for annotating runtime data and may also be accessed by the processing system 506.

Turning now specifically to the applications hosted by the client device 508, the web client 502 may access the various systems (e.g., the processing system 506) via the web interface supported by the web server 520. Similarly, the client application 504 (e.g., an "app" such as a payment processor app) may access the various services and functions provided by the processing system 506 via the programmatic interface provided by the API server 518. The client application 504 may be, for example, an "app" executing on the client device 508, such as an iOS or Android OS application to enable a user to access and input data on the networked system 516 in an offline manner and to perform batch-mode communications between the client application 504 and the networked system 516.

Further, while the network architecture 500 shown in FIG. 5 employs a client-server architecture, the present disclosure is not limited to such an architecture, and could equally well find application in a distributed, or peer-to-peer, architecture system, for example.

Figure 6:
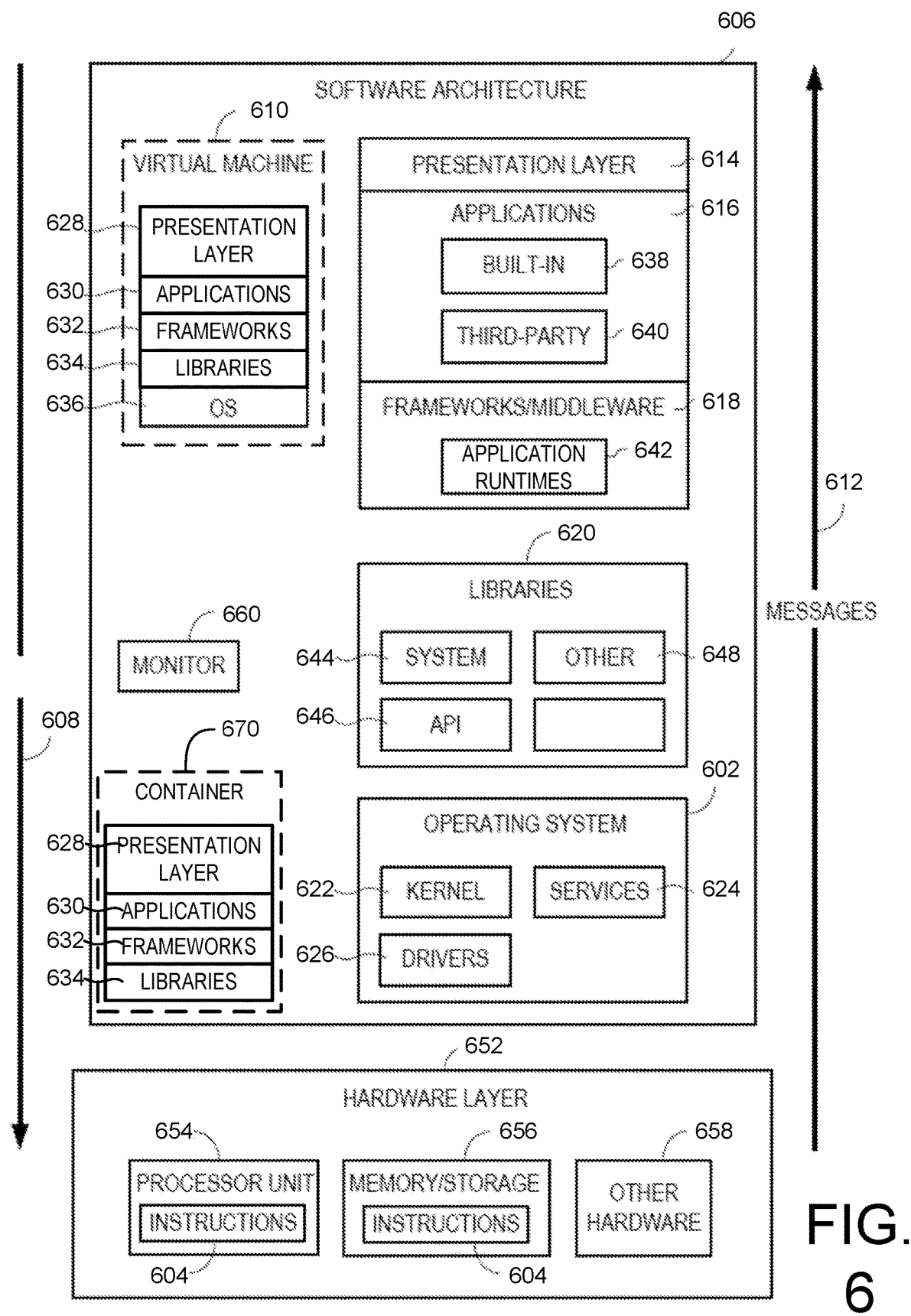
FIG. 6 is a block diagram illustrating a representative software architecture, which may be used in conjunction with various hardware architectures as described herein.

FIG. 6 is a block diagram illustrating an example software architecture 606, which may be used in conjunction with various hardware architectures herein described. FIG. 6 is a non-limiting example of a software architecture 606, and it will be appreciated that many other architectures may be implemented to facilitate the functionality described herein. The software architecture 606 may execute on hardware such as a machine 700 of FIG. 7 that includes, among other things, processors 704, memory/storage 706, and input/output (I/O) components 718. A representative hardware layer 652 is illustrated and can represent, for example, the machine 700 of FIG. 7. The representative hardware layer 652 includes a processor 654 having associated executable instructions 604. The executable instructions 604 represent the executable instructions of the software architecture 606, including implementation of the methods, components, and so forth described herein. The hardware layer 652 also includes non-transitory memory and/or storage modules as memory/storage 656, which also have the executable instructions 604. The hardware layer 652 may also include other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616 (such as the services of the processing system), and a presentation layer 614. Operationally, the applications 616 and/or other components within the layers may invoke API calls 608 through the software stack and receive a response as messages 612 in response to the API calls 608. The layers illustrated are representative in nature, and not all software architectures have all layers. For example, some mobile or special-purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than by interfacing directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), and the like. The libraries 620 may also include a wide variety of other libraries 648 to provide many other APIs to the applications 616 and other software components/modules.

The frameworks/middleware 618 provide a higher-level common infrastructure that may be used by the applications 616 and/or other software components/modules. For example, the frameworks/middleware 618 may provide high-level resource management functions, web application frameworks, application runtimes 642 (e.g., a Java virtual machine or JVM), and so forth. The frameworks/middleware 618 may provide a broad spectrum of other APIs that may be utilized by the applications 616 and/or other software components/modules, some of which may be specific to a particular operating system or platform.

The applications 616 include built-in applications 638 and/or third-party applications 640. The applications 616 may use built-in operating system functions (e.g., kernel 622, services 624, and/or drivers 626), libraries 620, and frameworks/middleware 618 to create user interfaces to interact with users of the system. Alternatively, or additionally, in some systems, interactions with a user may occur through a presentation layer, such as the presentation layer 614. In these systems, the application/component "logic" can be separated from the aspects of the application/component that interact with a user.

Some software architectures use virtual machines. In the example of FIG. 6, this is illustrated by a virtual machine 610. The virtual machine 610 creates a software environment where applications/components can execute as if they were executing on a hardware machine (such as the machine 700 of FIG. 7, for example). The virtual machine 610 is hosted by a host operating system (e.g., the operating system 602 in FIG. 6) and typically, although not always, has a virtual machine monitor 660 (or hypervisor), which manages the operation of the virtual machine 610 as well as the interface with the host operating system (e.g., the operating system 602). A software architecture executes within the virtual machine 610 such as an operating system (OS) 636, libraries 634, frameworks 632, applications 630, and/or a presentation layer 628. These layers of software architecture executing within the virtual machine 610 can be the same as corresponding layers previously described or may be different.

Some software architectures use containers 670 or containerization to isolate applications. The phrase "container image" refers to a software package (e.g., a static image) that includes configuration information for deploying an application, along with dependencies such as software components, frameworks, or libraries that are required for deploying and executing the application. As discussed herein, the term "container" refers to an instance of a container image, and an application executes within an execution environment provided by the container. Further, multiple instances of an application can be deployed from the same container image (e.g., where each application instance executes within its own container). Additionally, as referred to herein, the term "pod" refers to a set of containers that accesses shared resources (e.g., network, storage), and one or more pods can be executed by a given computing node. A container 670 is similar to a virtual machine in that it includes a software architecture including libraries 634, frameworks 632, applications 630, and/or a presentation layer 628, but omits an operating system and, instead, communicates with the underlying host operating system 602.

Figure 7:
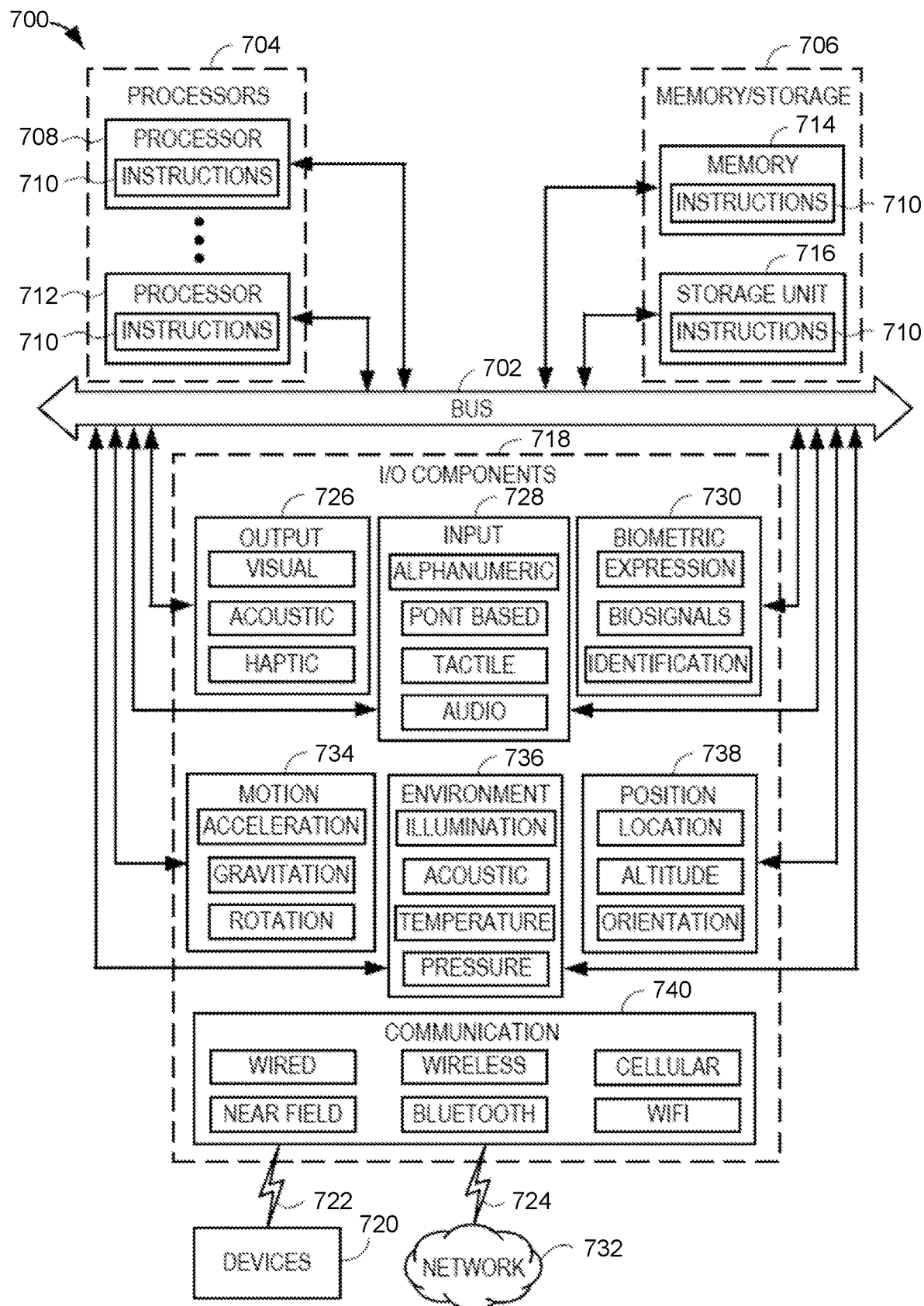
FIG. 7 is a block diagram illustrating components of a processing circuit or a processor, according to some example embodiments, configured to read instructions from a non-transitory computer-readable medium (e.g., a non-transitory machine-readable storage medium) and perform any one or more of the methods discussed herein.

FIG. 7 is a block diagram illustrating components of a machine 700, according to some example embodiments, able to read instructions from a non-transitory machine-readable medium (e.g., a computer-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or in parallel or concurrently, that specify actions to be taken by the machine 700. Further, while only a single machine 700 is illustrated, the term "machine" or "processing circuit" shall also be taken to include a collection of machines that individually or jointly execute the instructions 710 to perform any one or more of the methodologies discussed herein.

The machine 700 may include processors 704 (including processors 708 and 712), memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of the processors 704 are examples of machine-readable media.

The I/O components 718 may include a wide variety of components to receive input, provide output, produce output, transmit information, exchange information, capture measurements, and so on. The specific I/O components 718 that are included in a particular machine will depend on the type of machine. For example, portable machines such as mobile phones may include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion, and the grouping is in no way limiting. In various example embodiments, the I/O components 718 may include output components 726 and input components 728. The output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environment components 736, or position components 738, among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via a coupling 724 and a coupling 722, respectively. For example, the communication components 740 may include a network interface component or other suitable device to interface with the network 732. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting an NFC beacon signal that may indicate a particular location, and so forth.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art. Further, as used herein and in the claims, the phrase "at least one of element A, element B, or element C" is intended to convey any of: element A, element B, element C, elements A and B, elements A and C, elements B and C, and elements A, B, and C.

According to one embodiment of the present disclosure, a method for processing transactions includes: receiving a template plan and one or more configuration parameters, the template plan including a template query and one or more runtime prerequisites; evaluating the one or more runtime prerequisites; and in response to determining that the one or more runtime prerequisites are satisfied, executing a runtime action, including: rendering the template plan based on the one or more configuration parameters and one or more runtime parameters to generate the runtime action including a runtime query; running the runtime query to query one or more source data stores to obtain runtime data; annotating the runtime data to generate an intermediate result; storing the intermediate result in an intermediate result data store; receiving an approval of the intermediate result; and in response to receiving the approval of the intermediate result via a user interface, writing the intermediate result from the intermediate result data store to a sink data store.

The annotating the runtime data may include tagging the intermediate result with annotations in accordance with the runtime query.

The one or more runtime prerequisites may be configured by at least one parameter among the one or more configuration parameters.

The method may further include: registering the template query and the one or more configuration parameters as a job in a scheduler, the one or more configuration parameters including scheduling parameters, and the scheduler may be configured to evaluate the one or more runtime parameters periodically set by a schedule configured based on the scheduling parameters.

The one or more runtime prerequisites may include prerequisites based on a current date at runtime.

The one or more runtime prerequisites may include prerequisites based on credentials to access the one or more source data stores.

The method may further include displaying the intermediate result on a user interface, and the approval of the intermediate result may be received via the user interface.

The method may further include: displaying, on the user interface, a trace of execution operations of the runtime query that generated the intermediate result based on the runtime data from the one or more source data stores in accordance with the configuration of the runtime query by the one or more configuration parameters.

According to one embodiment of the present disclosure, a system includes: a processor; and memory storing instructions that, when executed by the processor, cause the processor to: receive a template plan and one or more configuration parameters, the template plan including a template query and one or more runtime prerequisites; evaluate the one or more runtime prerequisites; and in response to determining that the one or more runtime prerequisites are satisfied, execute a runtime action, including: rendering the template plan based on the one or more configuration parameters and one or more runtime parameters to generate the runtime action including a runtime query; running the runtime query to query one or more source data stores to obtain runtime data; annotating the runtime data to generate an intermediate result; storing the intermediate result in an intermediate result data store; and displaying a trace of execution operations of the runtime query that generated the intermediate result based on the runtime data from the one or more source data stores in accordance with the configuration of the runtime query by the one or more configuration parameters.

The instructions for annotating the runtime data may include instructions to tag the intermediate result with annotations in accordance with the runtime query.

The one or more runtime prerequisites may be configured by at least one parameter among the one or more configuration parameters.

The memory may further store instructions that, when executed by the processor, cause the processor to register the template query and the one or more configuration parameters as a job in a scheduler, the one or more configuration parameters including scheduling parameters, and the scheduler may be configured to evaluate the one or more runtime parameters periodically set by a schedule configured based on the scheduling parameters.

The one or more runtime prerequisites may include prerequisites based on a current date at runtime.

The one or more runtime prerequisites may include prerequisites based on credentials to access the one or more source data stores.

The memory may further store instructions that, when executed by the processor, cause the processor to receive approval of the intermediate result via a user interface.

The memory may further store instructions that, when executed by the processor, cause the processor to write the intermediate result from the intermediate result data store to a sink data store.

According to one embodiment of the present disclosure, a non-transitory computer-readable medium storing instructions that, when executed by a processor, cause the processor to: receive a template plan and one or more configuration parameters, the template plan including a template query and one or more runtime prerequisites; evaluate the one or more runtime prerequisites; and in response to determining that the one or more runtime prerequisites are satisfied, execute a runtime action, including: rendering the template plan based on the one or more configuration parameters and one or more runtime parameters to generate the runtime action including a runtime query; running the runtime query to query one or more source data stores to obtain runtime data; annotating the runtime data to generate an intermediate result; storing the intermediate result in an intermediate result data store; receiving an approval of the intermediate result; and in response to receiving the approval of the intermediate result via a user interface, writing the intermediate result from the intermediate result data store to a sink data store.

The non-transitory computer-readable medium may further store instructions that, when executed by the processor, cause the processor to register the template query and the one or more configuration parameters as a job in a scheduler, the one or more configuration parameters including scheduling parameters, and the scheduler may be configured to evaluate the one or more runtime parameters periodically set by a schedule configured based on the scheduling parameters.

The one or more runtime prerequisites may include prerequisites based on credentials to access the one or more source data stores.

The non-transitory computer-readable medium may further store instructions that, when executed by the processor, cause the processor to display the intermediate result on a user interface, wherein the approval of the intermediate result is received via the user interface.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for processing transactions comprising:
   receiving a template plan and one or more configuration parameters together, the template plan comprising a template query and one or more runtime prerequisites; and
   executing a job based on the template plan, comprising:
      evaluating the one or more runtime prerequisites based on one or more current values of one or more runtime parameters at runtime to determine whether all data for processing the job is available when executing the job; and
      in response to determining that the one or more runtime prerequisites are satisfied, executing a runtime action, comprising:
         rendering the template plan based on the one or more configuration parameters and current values of the one or more runtime parameters determined during the generation of the runtime action, wherein the runtime action comprises a runtime query;
         running the runtime query to query one or more source data stores to obtain runtime data;
         annotating the runtime data to generate an intermediate result;
         storing the intermediate result in an intermediate result data store;
         receiving an approval of the intermediate result; and
         in response to receiving the approval of the intermediate result via a user interface, writing the intermediate result from the intermediate result data store to a sink data store.

2. The method of claim 1, wherein annotating the runtime data comprises tagging the intermediate result with annotations in accordance with the runtime query.

3. The method of claim 1, wherein the one or more runtime prerequisites are configured by at least one parameter among the one or more configuration parameters.

4. The method of claim 1, further comprising:
   registering the template query and the one or more configuration parameters as a job in a scheduler, the one or more configuration parameters comprising scheduling parameters, and
   wherein the scheduler is configured to evaluate the one or more runtime parameters periodically set by a schedule configured based on the scheduling parameters.

5. The method of claim 4, wherein the one or more runtime prerequisites comprise prerequisites based on a current date at runtime.

6. The method of claim 1, wherein the one or more runtime prerequisites comprise prerequisites based on credentials to access the one or more source data stores.

7. The method of claim 1, further comprising displaying the intermediate result on a user interface,
   wherein the approval of the intermediate result is received via the user interface.

8. The method of claim 1, further comprising:
   displaying, on the user interface, a trace of execution operations of the runtime query that generated the intermediate result based on the runtime data from the one or more source data stores in accordance with the configuration of the runtime query by the one or more configuration parameters.

9. A system comprising:
   a processor; and
   memory storing instructions that, when executed by the processor, cause the processor to:
      receive a template plan and one or more configuration parameters, the template plan comprising a template query and one or more runtime prerequisites; and
      execute a job based on the template plan, comprising instructions that, when executed by the processor, cause the processor to:
         evaluate the one or more runtime prerequisites based on one or more current values of one or more runtime parameters at runtime to determine whether all data for processing the job is available when executing the job; and
         in response to determining that the one or more runtime prerequisites are satisfied, execute a runtime action, comprising:
            rendering the template plan based on the one or more configuration parameters and current values of the one or more runtime parameters determined during the generation of the runtime action, wherein the runtime action comprises a runtime query;
            running the runtime query to query one or more source data stores to obtain runtime data;
            annotating the runtime data to generate an intermediate result;
            storing the intermediate result in an intermediate result data store; and
            displaying a trace of execution operations of the runtime query that generated the intermediate result based on the runtime data from the one or more source data stores in accordance with the configuration of the runtime query by the one or more configuration parameters.

10. The system of claim 9, wherein the instructions for annotating the runtime data comprise instructions to tag the intermediate result with annotations in accordance with the runtime query.

11. The system of claim 9, wherein the one or more runtime prerequisites are configured by at least one parameter among the one or more configuration parameters.

12. The system of claim 9, wherein the memory further stores instructions that, when executed by the processor, cause the processor to register the template query and the one or more configuration parameters as a job in a scheduler, the one or more configuration parameters comprising scheduling parameters, and wherein the scheduler is configured to evaluate the one or more runtime parameters periodically set by a schedule configured based on the scheduling parameters.

13. The system of claim 12, wherein the one or more runtime prerequisites comprise prerequisites based on a current date at runtime.

14. The system of claim 9, wherein the one or more runtime prerequisites comprise prerequisites based on credentials to access the one or more source data stores.

15. The system of claim 9, wherein the memory further stores instructions that, when executed by the processor, cause the processor to receive approval of the intermediate result via a user interface.

16. The system of claim 15, wherein the memory further stores instructions that, when executed by the processor, cause the processor to write the intermediate result from the intermediate result data store to a sink data store.

17. A non-transitory computer-readable medium storing instructions that, when executed by a processor, cause the processor to:
  receive a template plan and one or more configuration parameters together, the template plan comprising a template query and one or more runtime prerequisites; and
  execute a job based on the template plan, comprising instructions that, when executed by the processor, cause the processor to:
    evaluate the one or more runtime prerequisites, including conditions to be satisfied, based on one or more current values of one or more runtime parameters at runtime to determine whether all data for processing the job is available when executing the job; and
    in response to determining that the one or more runtime prerequisites are satisfied, execute a runtime action, comprising:
      rendering the template plan based on the one or more configuration parameters and current values of the one or more runtime parameters determined during the generation of the runtime action, wherein the runtime action comprises a runtime query;
      running the runtime query to query one or more source data stores to obtain runtime data;
      annotating the runtime data to generate an intermediate result;
      storing the intermediate result in an intermediate result data store;
      receiving an approval of the intermediate result; and
      in response to receiving the approval of the intermediate result via a user interface, writing the intermediate result from the intermediate result data store to a sink data store.

18. The non-transitory computer-readable medium of claim 17, further storing instructions that, when executed by the processor, cause the processor to register the template query and the one or more configuration parameters as a job in a scheduler, the one or more configuration parameters comprising scheduling parameters,
  wherein the scheduler is configured to evaluate the one or more runtime parameters periodically set by a schedule configured based on the scheduling parameters.

19. The non-transitory computer-readable medium of claim 17, wherein the one or more runtime prerequisites comprise prerequisites based on credentials to access the one or more source data stores.

20. The non-transitory computer-readable medium of claim 17, further storing instructions that, when executed by the processor, cause the processor to display the intermediate result on a user interface,
  wherein the approval of the intermediate result is received via the user interface.

* * * * *